United States Patent
Irie

(10) Patent No.: US 9,366,796 B2
(45) Date of Patent: Jun. 14, 2016

(54) SIDE LIGHTING OPTICAL FIBER

(75) Inventor: Shinichi Irie, Tokyo (JP)

(73) Assignee: 3M Innovative Properties Company, St. Paul, MN (US)

( * ) Notice: Subject to any disclaimer, the term of this patent is extended or adjusted under 35 U.S.C. 154(b) by 977 days.

(21) Appl. No.: 12/992,935

(22) PCT Filed: Apr. 17, 2009

(86) PCT No.: PCT/US2009/040893
§ 371 (c)(1),
(2), (4) Date: Nov. 16, 2010

(87) PCT Pub. No.: WO2009/140025
PCT Pub. Date: Nov. 19, 2009

(65) Prior Publication Data
US 2011/0063872 A1    Mar. 17, 2011

(30) Foreign Application Priority Data
May 16, 2008    (JP) ................................. 2008-129313

(51) Int. Cl.
*F21V 8/00*    (2006.01)
*B60Q 3/00*    (2006.01)

(52) U.S. Cl.
CPC ............... *G02B 6/001* (2013.01); *B60Q 3/004* (2013.01)

(58) Field of Classification Search
CPC ................................. G02B 6/001; B60Q 3/004
USPC .......................................... 362/565; 385/123
See application file for complete search history.

(56) References Cited

U.S. PATENT DOCUMENTS

| | | | | |
|---|---|---|---|---|
| 4,799,748 A * | 1/1989 | Brown | ............................ | 385/31 |
| 5,579,429 A * | 11/1996 | Naum | ............................ | 385/143 |
| 5,857,761 A * | 1/1999 | Abe et al. | ...................... | 362/551 |
| 5,910,375 A * | 6/1999 | Parker et al. | ................... | 428/520 |
| 6,072,171 A * | 6/2000 | Nakamura et al. | ............. | 250/216 |
| 6,104,857 A | 8/2000 | Ishiharada et al. | | |
| 6,108,476 A * | 8/2000 | Iimura | ........................... | 385/128 |
| 6,154,595 A * | 11/2000 | Yokogawa et al. | ........... | 385/127 |
| 6,169,836 B1 | 1/2001 | Sugiyama et al. | | |
| 6,268,600 B1* | 7/2001 | Nakamura et al. | ............. | 250/216 |
| 6,290,364 B1* | 9/2001 | Koike et al. | ................... | 362/620 |
| 6,571,482 B1* | 6/2003 | Tymianski | ...................... | 33/265 |
| 6,604,315 B1* | 8/2003 | Smith et al. | ..................... | 42/112 |
| 7,194,184 B2 | 3/2007 | Buelow, II et al. | | |
| 7,466,896 B2* | 12/2008 | Tao et al. | ........................ | 385/147 |
| 7,474,706 B2* | 1/2009 | Wang et al. | .................... | 375/295 |
| 2001/0016105 A1* | 8/2001 | Sugiyama et al. | ............. | 385/133 |

(Continued)

FOREIGN PATENT DOCUMENTS

| | | |
|---|---|---|
| EP | 0841151 | 5/1998 |
| JP | H03-289605 | 12/1991 |

(Continued)

OTHER PUBLICATIONS

PCT International Search Report for PCT/US2009/040893, mailed Oct. 30, 2009.

*Primary Examiner* — Stephen F Husar
(74) *Attorney, Agent, or Firm* — Robert S. Moshrefzadeh

(57) ABSTRACT

A side lighting optical fiber 1 having a core 2 containing a first light scattering agent 4, and a clad disposed generally concentric to the core and containing a second light scattering agent 5, such that light transmittance of the clad 3 at wavelength of 550 nm is in the range of 70-90%.

19 Claims, 3 Drawing Sheets

(56) References Cited

U.S. PATENT DOCUMENTS

| | | |
|---|---|---|
| 2003/0214804 A1* | 11/2003 | Irie .................. 362/27 |
| 2004/0179777 A1 | 9/2004 | Buelow, II et al. |
| 2005/0185402 A1* | 8/2005 | Hsu .................. 362/257 |
| 2005/0234436 A1* | 10/2005 | Baxter et al. .......... 606/14 |
| 2006/0178254 A1* | 8/2006 | Takeda et al. .......... 501/1 |
| 2007/0194693 A1* | 8/2007 | Saito et al. .......... 313/503 |
| 2008/0170413 A1* | 7/2008 | Beeson et al. .......... 362/612 |
| 2011/0063872 A1* | 3/2011 | Irie .................. 362/565 |

FOREIGN PATENT DOCUMENTS

| | | |
|---|---|---|
| JP | 61-09924 | 4/1994 |
| JP | 2000-131529 | 5/2000 |
| JP | 2000-321444 | 11/2000 |
| JP | 2003-021727 | 1/2003 |
| JP | 2004-146225 | 5/2004 |
| WO | WO 2006/124548 | 11/2006 |
| WO | WO 2006124548 A1 * | 11/2006 |

* cited by examiner

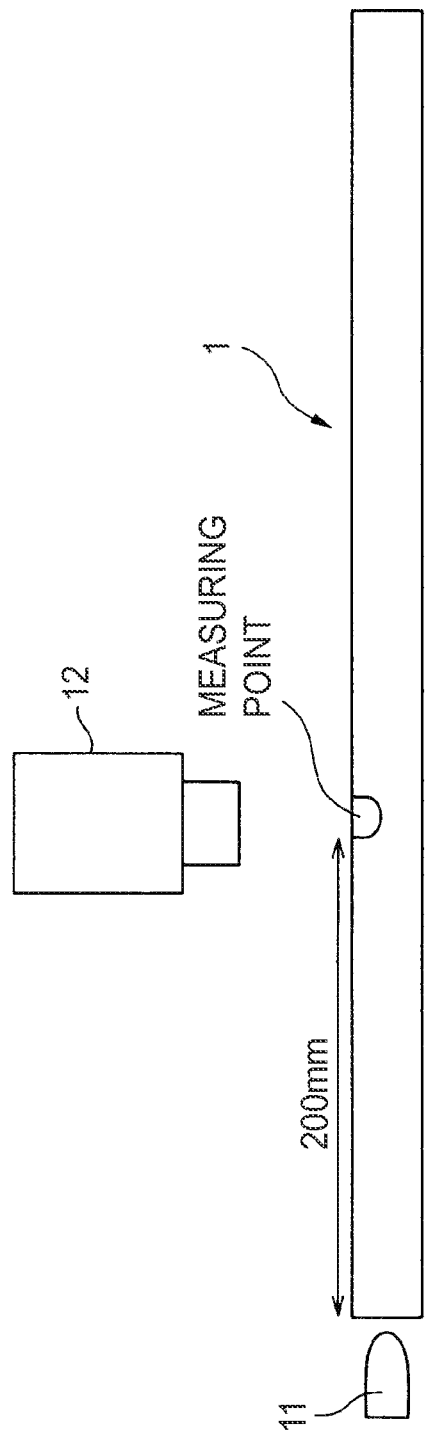

SIDE LIGHTING OPTICAL FIBER

CROSS REFERENCE TO RELATED APPLICATIONS

This application is a national stage filing under 35 U.S.C. 371 of PCT/US2009/040893, filed Apr. 17, 2009, which claims priority to Japan Application No. 2008-129313, filed May 16, 2008, the disclosure of which is incorporated by reference in its/their entirety herein.

FIELD OF THE INVENTION

The present invention relates to a side lighting optical fiber that is applicable, for example, as auxiliary side illumination for a vehicle, a building and the like.

BACKGROUND ART

As an approach for increasing the side lighting brightness of a non-directional side lighting type plastic optical fiber, a method has been known in which the side lighting brightness and the decay rate of side lighting brightness is controlled by adding a minute amount of titanium oxide to the clad and varying the content of titanium oxide (see, e.g., Japanese Patent No. 3384396, published on Mar. 10, 2003).

As another approach for increasing the side lighting brightness of a non-directional side lighting type plastic optical fiber, a method has been known in which the side lighting brightness is controlled by adding light scattering agent to the core and varying the content of light scattering agent (see, e.g., Japanese Patent Publication No. 2000-131529, published on May 12, 2000).

However, when titanium oxide is added to the clad as in the optical fiber, if separation of layers occurs at the core/clad interface due to shock or the like, light scattering is reduced at the separated region, which gives rise to the appearance of so-called "dark defect", leading to impairment of the external appearance of the fiber.

On the other hand, when light scattering agent is added to the core as in the optical fiber, since light scattering takes place not at the core/clad interface but in the core, layer separation at the core/clad interface is unlikely to give rise to the appearance of "dark defect", and the fiber appearance can be maintained in good condition. However, with this optical fiber, since the clad is free of light scattering agent and is transparent, if scratch is produced on the clad surface, the scratch may strongly scatter light, giving rise to so-called "bright spot", which again leads to impairment of the external appearance of the fiber.

SUMMARY

In one aspect the present disclose provides a side lighting optical fiber comprising a core containing a first light scattering agent, and a clad disposed generally concentric to the core and containing a second light scattering agent, wherein light transmittance of the clad at a wavelength of 550 nm is in a range from 70% to 90%. Typically, even if there is layer separation at the core/clad interface or scratch on the clad surface, these defects do not become conspicuous and good external appearance and characteristics can be obtained.

Typically, side lighting optical fibers described herein exhibits good external appearance and characteristics which are not significantly affected by possible layer separation at the core/clad interface or possible scratch on the clad surface.

BRIEF DESCRIPTION OF THE DRAWINGS

FIG. 4 is a view useful for explaining the method for measuring side lighting brightness.

DETAILED DESCRIPTION

Figure 1:
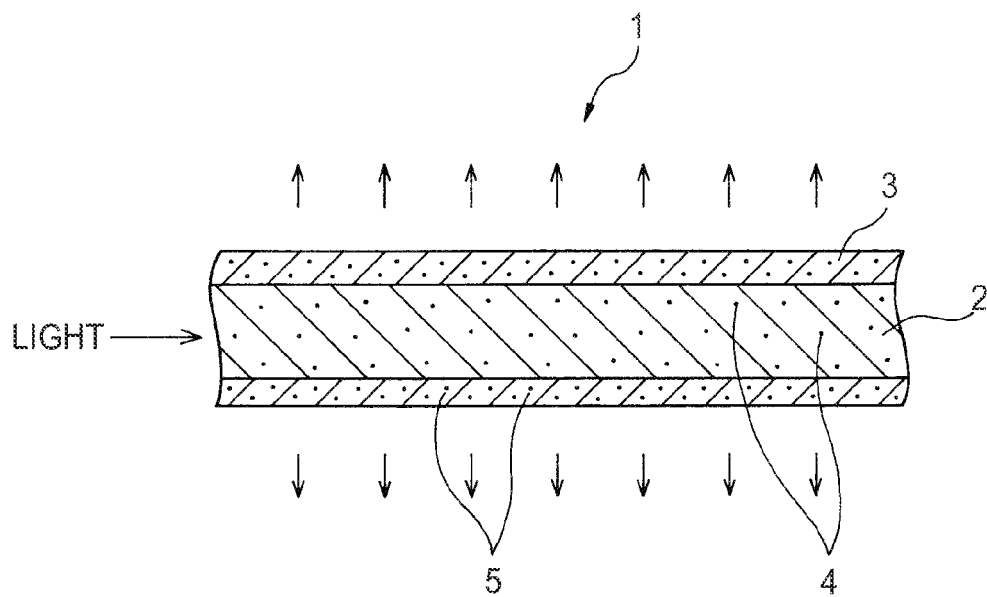
FIG. 1 is a sectional view showing a side lighting optical fiber according to an embodiment of the present invention.

Referring to FIG. 1, lighting optical fiber 1 has core 2 and clad 3 disposed generally concentric thereto. Core 2 and clad 3 contain light scattering agents 4 and 5, respectively. Optical fiber 1 can be supplied with light from a light source (not shown) such as a light emitting diode (LED) or a laser through at least one end of the fiber and can thereby emit the light from the side surface thereof. Length of optical fiber 1 may be as long as 5 m or more depending on applications.

Resinous lighting optical fiber 1 may consist, as a typical example, of core 2 formed of acrylic resin, and clad 3 formed of fluoro-resin. Resin material that can be applied to core 2 and clad 3 is not particularly limited as long as refractive index of core 2 is greater than the refractive index of clad 3. Since resinous lighting optical fiber 1 is highly flexible, it provides high handling freedom, and can be bent in arbitrary direction. Thus, lighting optical fiber 1 can take various forms such as linear form, curved form, etc., in accordance with the layout of the path.

The size of the lighting optical fiber is not limited to a specified size, but may be any size as long as it can be formed from resin. Typical size of lighting optical fiber 1 may include the size of 3.5 mm in outer diameter. Outer diameters of several mm to several dozens mm can also be stably fabricated.

Figure 2:
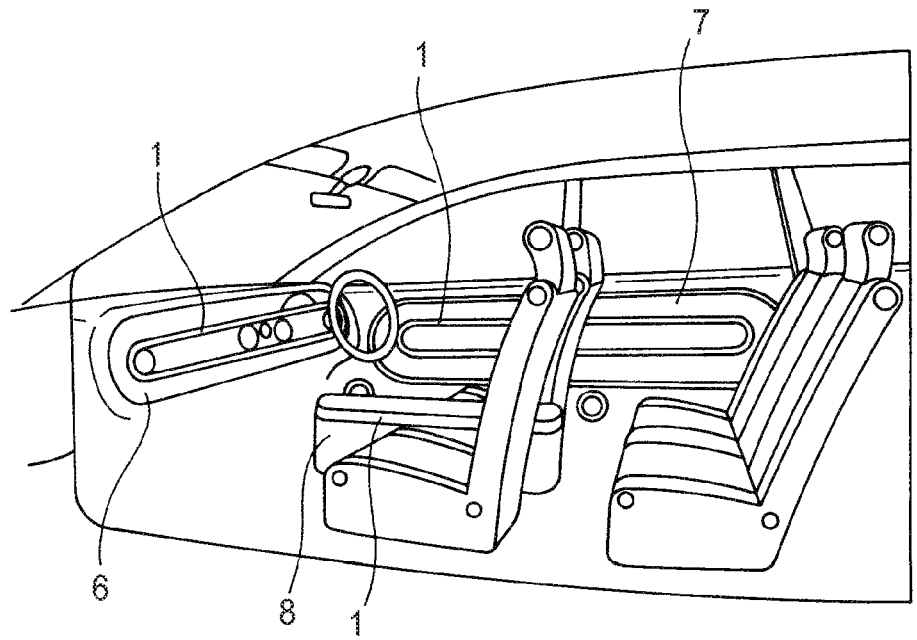
FIG. 2 is a view useful for explaining the application of the side lighting optical fiber shown in FIG. 1 to a vehicle.

Referring to FIG. 2, exemplary lighting optical fiber described herein applied to an auxiliary illumination for a vehicle as a typical application. As shown in FIG. 2, lighting optical fiber 1 from FIG. 1 can be provided, for example, in the vicinity of instrument panel 6, door panel 7, or console box 8, respectively, as an auxiliary illumination. Although not shown, lighting optical fiber 1 can also be applied as a curtain lamp, a map lamp, or a room lamp. It is also possible to use it for exterior decoration applications. Other than vehicle applications, applications of lighting optical fiber 1 include signboards, show windows, show cases, and the like. As will be described in detail below, lighting optical fiber 1 can provide good external appearance even when there are layer separations or scratches.

The construction of exemplary lighting optical fibers described herein are more detail below. As shown in FIG. 1, optical fiber 1 has core 2 and clad 3, respectively, containing specified amount of light scattering agents 4, 5 added thereto. As used herein, "light scattering agent" means a substance capable of scattering the light of the light source used, and its material or shape is not particularly limited. Light scattering agents 4 and 5 contained in core 2 and clad 3, respectively, may be of same or different material, shape, or size. Two or more materials can be used as light scattering agent 4 or 5.

In exemplary optical fiber 1, light transmittance of clad 3 at the wavelength of light used as a light source is adjusted. For example, it is adjusted to the light transmittance of 70-90% at the wavelength of 550 nm. This adjustment of light transmittance can be effected, for example, by the material of clad 3, thickness of clad 3, or by addition of other additives than the light scattering agent contained in clad 3, and the method of this adjustment is not particularly restricted. When transparency of clad 3 increases and the light transmittance of clad 3 is higher than 90%, scratch on the surface of clad 3 becomes conspicuous. With light transmittance of not higher than 90%, smaller scratch such as those caused by abrasion becomes less conspicuous, and is almost invisible with naked eyes in ordinary usage condition. With light transmittance of not higher than 85%, or not higher than 83%, scratch on the surface of clad 3 becomes more invisible. On the other hand, when the light transmittance of clad 3 is less than 70%, if layer separation is produced between core 2 and clad 3, the difference of the light scattering and transparency between the separated portion and other portions becomes larger, and the separated portion becomes more conspicuous. With light transmittance of not lower than 70%, the separated portion becomes less conspicuous, and is almost invisible with naked eyes in ordinary usage condition. With light transmittance of not lower than 73%, or not lower than 75%, the separated portion becomes more invisible. Also, by adding a specified amount of light scattering agent 4 to core 2, decrease of light scattering at the separated portion of the core/clad interface (so-called dark defect) can be prevented, and by adding a specified amount of light scattering agent 5 to clad 3, strong light scattering due to the presence of scratches on the clad surface (so-called bright spot) can be prevented.

As has been described above, material of light scattering agent 4 contained in core 2 is not particularly restricted, but, when core 2 is formed of acrylic resin, light scattering agent 4 may be silicone particles or titanium oxide particles. Especially when silicone particles are used as light scattering agent 4, the acrylic monomer may be mixed with the light scattering agent in manufacturing process, and may be polymerized to obtain core 2. In this case, since silicone particles are not easily sedimented, good dispersion can be maintained and light scattering agent 4 can be homogeneously distributed in core 2.

The amount of light scattering agent 4 contained in the core 2 may be in the range of 0.0005-0.1% by mass, or 0.0008-0.08% by mass, or 0.001-0.005% by mass. When core 2 contains 0.005% by mass or more of light scattering agent, the portion of the layer separation at the core/clad interface can be effectively made less conspicuous. When 0.008% by mass or more, or 0.01% by mass or more of light scattering agent is contained, this effect becomes more evident and the portion of layer separation can be further made less conspicuous. On the other hand, when the amount of the light scattering agent 4 contained in core 2 exceeds 0.1% by mass, brightness of side lighting near the light source becomes too strong, and as a result, the brightness of side lighting farther away from the light source drops considerably. Material of light scattering agent 5 contained in clad 3 is not particularly restricted, but, when clad 3 is formed of fluoro-resin, light scattering agent 5 is preferably zinc oxide particles, for example.

Examples of resin material applicable to core 2 may include, in addition to the acrylic resins, polycarbonate (PC), ethylidene-norbornene polymer, styrene-ethylene-butadiene-styrene block polymer (SEBS), and the like. Acrylic resins may include homopolymers formed by polymerization of one monomer selected from acrylic acid and methacrylic acid as well as their ester with monohydric alcohol, or copolymers formed by co-polymerization of two or more monomers.

Examples of resin material applicable to clad 3 may include, in addition to the fluoro polymers, silicone polymers. Specifically, examples include silicone polymers such as polydimethyl siloxane polymer, polymethyl phenyl siloxane polymer; polytetrafluoroethylene (PTFE), tetrafluoroethylene hexafluoropropylene copolymer (FEP), tetrafluoroethylene perfluoroalkoxyethylene (PFE), polychlorotrifluoroethylene (PCTFE), tetrafluoroethylene ethylene copolymer (ETFE), polyvinylidene fluoride, polyvinyl fluoride, fluorovinylidene trifluoroethylene chloride copolymer, fluorovinylidene hexafluoropropylene copolymer, fluorovinylidene hexafluoropropylene tetrafluoroethylene terpolymer, and the like.

Examples of light scattering agents 4, 5 contained in core 2, clad 3 include, in addition to the silicone particles and zinc oxide particles as described above, organic polymer particles such as polystyrene resin particles; metal oxide particles such as alumina particles, silicon oxide particles; fluoride particles, carbonate particles. These particles can be used alone or in combination of two or more of them. Mean particle size of the light scattering agent is in the range of 0.1-30 micrometers, preferably 1-15 micrometers. If mean particle size is greater than 30 micrometers, particles tend to precipitate during solidification, and the light scattering property is degraded. If mean particle size is smaller than 0.1 micrometers, dependence of visible light scattering on wavelength becomes pronounced so that light of short wavelength (blue) is more strongly scattered and light of long wavelength (red) is scattered only weakly.

Method of manufacturing the optical fiber according to the embodiments of the present invention is not particularly limited. For example, extrusion molding method can be used to extrude at high temperature the clad material having the light scattering agent 5 mixed therein into tubular form and then to cool it to form clad 3. Then, the core resin material having the light scattering agent in fluidized state can be poured and filled into the hollow tube of clad 3, and can then be heated to harden the core resin material.

It is also possible, as another manufacturing method, to use co-extrusion method in which, for example, when the tubular clad material is molded in extrusion, core resin material is extruded simultaneously into the extruded hollow clad. In this method, light scattering body can be continuously manufactured in long length.

Next, the present invention will be described with reference to specific examples. It is to be understood that these examples are only illustrative and are not intended to restrict the scope of the invention.

EXAMPLE 1

1. Preparation of the Clad 100 parts by mass of tetrafluoroethylene hexafluoropropylene copolymer (FEP) (obtained under the trade designation "FEP-100J" from Du Pont Mitsui Fluoro chemicals Co., Tokyo, Japan), and 1 part by mass of FEP resin dispersed with 10% by mass of zinc oxide (obtained under the trade designation "FCMSM1109-White (D)" from Dainichiseika Color & Chemicals Co., Tokyo, Japan, were placed in a can and were mixed for 1 minute by hand shaking. The resulting mixture was extruded using an extruder with the mold heated to about 395° C. at speed of about 3 mm/minutes, and the extruded molding was cooled with water. Tubular clad of 3.25 mm in outer diameter and 0.25 mm in thickness was thus obtained. About 0.099% by mass of zinc oxide was contained in this clad as light scattering agent 5. The clad thus prepared had light transmittance of 80% at light wavelength of 550 nm. Method of measuring light transmittance is described below.

2. Preparation of the Core

Core 2 was prepared by mixing 10 parts by mass hydroxyethyl methacrylate, 75 parts by mass n-butyl methacrylate, 25 parts by mass 2-ethyl hexyl methacrylate, 1 part by mass triethylene glycol methacrylate for 1 minute with a stirring rod to prepare monomer mixture solution. To this mixture solution, 0.0065% by mass silicone resin particle (obtained under the trade designation "TP-120" (mean particle size: 2 micrometer) from Momentive Performance Co., Tokyo, Japan), was added as light scattering agent 4, and stirred for about 30 minutes to provide a dispersion. Then, 2% by mass lauroyl peroxide as a polymerization initiator was added, and stirred for about 30 minutes to dissolve the initiator and provide the core precursor solution.

From one end of tubular clad 3 (described above), the core precursor solution was injected at room temperature. Thereafter, one end was sealed, and with air applied from the other end under pressure, clad 3 was placed in water at about 90° C. sequentially from the sealed end for about 20 minutes to form a solid core by heat polymerization. Resulting side lighting optical fiber 1 had outer diameter of about 3.5 mm due to expansion during the core injection.

EXAMPLE 2

75 parts by mass of FEP ("FEP-100J") and 1 part by mass of FEP resin dispersed with 10% by mass of zinc oxide ("FCMSM1109-White (D)") were mixed, and was formed into a tube of 3.25 mm in outer diameter and 0.25 mm in thickness. With this, about 0.132% by mass zinc oxide was contained in this clad as light scattering agent 5. Resulting clad 3 had light transmittance of 72% at light wavelength of 550 nm. Core 2 was prepared as described for Example 1 to provide side lighting optical fiber 1.

EXAMPLE 3

150 parts by mass FEP ("FEP-100J") and 1 part mass FEP resin dispersed with 10% by mass of zinc oxide ("FC-MSM1109-White (D)") were mixed, and formed into a tube of 3.25 mm in outer diameter and 0.25 mm in thickness. With this, about 0.066% by mass of zinc oxide was contained in the clad as light scattering agent 5. Clad 3 thus prepared had light transmittance of 83% at light wavelength of 550 nm. Core 2 was prepared as described for Example 1 to provide side lighting optical fiber 1.

EXAMPLE 4

200 parts by mass of FEP ("FEP-100J") and 1 part by mass of FEP resin dispersed with 10% by mass of zinc oxide ("FCMSM1109-White (D)") were mixed, and formed into a tube of 3.25 mm in outer diameter and 0.25 mm in thickness. With this, about 0.050% by mass zinc oxide was contained in clad 2 as light scattering agent 5. Clad 3 thus prepared had light transmittance of 86% at light wavelength of 550 nm. Core 2 was prepared as described for Example 1 to provide side lighting optical fiber 1.

EXAMPLE 5

Clad 3 was prepared as described for Example 1. Core 2 was prepared as described for Example 1, except 0.05% by mass of silicone resin particles ("TP-120") was dispersed as light scattering agent 4, to provide side lighting optical fiber 1.

EXAMPLE 6

Clad 3 was prepared as described for Example 1. Core 2 was prepared as described for Example 1, except 0.001% by mass silicone resin particles ("TP-120") was dispersed as light scattering agent 4, to provide side lighting optical fiber 1.

EXAMPLE 7

Clad 3 was prepared as described for Example 1. 100 parts by mass of FEP ("FEP-100J") and 1 part by mass of FEP resin dispersed with 10% by mass of zinc oxide ("FCMSM1109-White (D)") were mixed, and then extruded using an extruder to form tubular shape of 3.25 mm in outer diameter and 0.25 mm in thickness. With this, about 0.099% by mass zinc oxide was contained in the clad as light scattering agent 5. The resulting clad had light transmittance of 80% at light wavelength of 550 nm. Core 2 was prepared as described for Example 1, except 0.1% by mass silicone resin particles ("TP-120") was dispersed as light scattering agent 4, to provide side lighting optical fiber 1.

EXAMPLE 8

Clad 3 was prepared as described for Example 1. Core 2 was prepared as described for Example 1, except 0.0005% by mass silicone resin particles ("TP-120") was dispersed as light scattering agent 4, to provide side lighting optical fiber 1.

COMPARATIVE EXAMPLE A 50 parts by mass of FEP ("FEP-100J") and 1 part by mass of FEP resin dispersed with 10% by mass of zinc oxide ("FCMSM1109-White (D)") were mixed, and then extruded using an extruder to form tubular shape of 3.25 mm in outer diameter and 0.25 mm in thickness. With this, about 0.19% by mass zinc oxide was contained in the clad as a light scattering agent. The resulting clad had light transmittance of 65% at light wavelength of 550 nm. The core was prepared as described for Example 1, to provide a side lighting optical fiber.

COMPARATIVE EXAMPLE B

FEP ("FEP-100J") was extruded using an extruder to form tubular shape of 3.25 mm in outer diameter and 0.25 mm in thickness. The clad did not contain a light scattering agent. The resulting clad had light transmittance of 93% at light wavelength of 550 nm. The core was prepared as described for Example 1, to provide a side lighting optical fiber.

COMPARATIVE EXAMPLE C

A clad containing no light scattering agent was prepared as described for Comparative Example 2, except no light scattering agent was added. The core was prepared as described for Comparative Example B, except the silicone resin particles ("TP-120") (i.e., light scattering agent) were not added. The resulting side lighting optical fiber contained no light scattering agent in either the core or in the clad.

Figure 3:
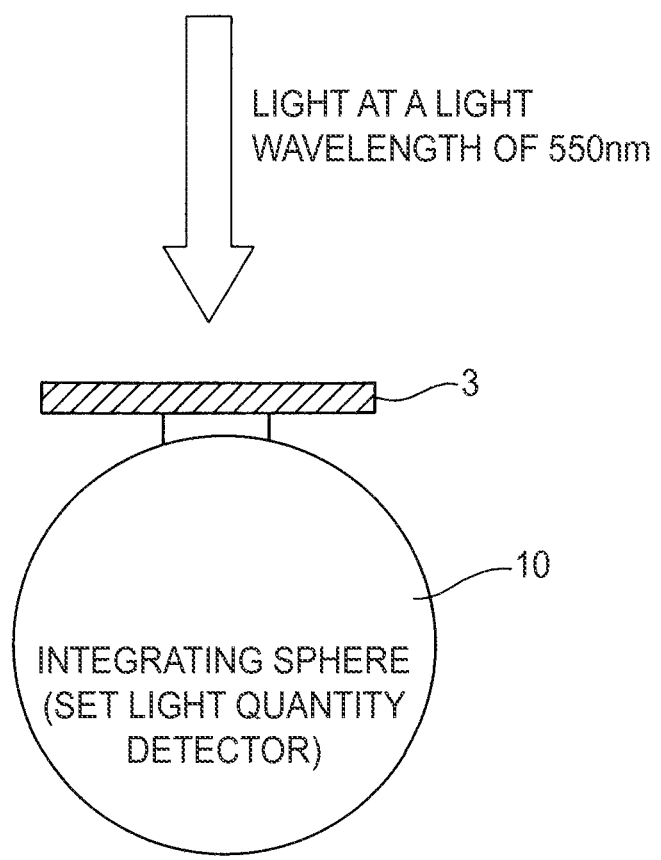
FIG. 3 is a view useful for explaining the method for measuring light transmittance.

Measurement of light transmittance on Examples 1-8 and Comparative Examples A-C side lighting optical fibers was done by the method shown in FIG. 3. Measurement of light transmittance on clad 3 was done by using a spectrophotometer (obtained under the grade designation "U-4100" from Hitachi Co., Tokyo, Japan) with cell length of 10.0 mm, scan speed of 300 nm/min, sampling interval of 0.50 nm, and slit of 5.00 nm. Measurement was done by directing the incident light of wavelength of 550 nm to the front surface of clad 3 cut in the shape of a film, and by detecting transmitted light transmitted to the back surface of clad 3 with integrating sphere 10. Light transmittance of the clad at wavelength of 550 nm is shown for each Example in Table 1, below.

Measurement of brightness of Examples 1-8 and Comparative Examples A-C was done by the method shown in FIG. 4. Since too weak side brightness is not practical, measurement was limited to side brightness of 6 candelas or higher. As shown in FIG. 4, a LED light source (obtained under the trade designation "NSPW 300CS" from Nichia Co., Anan, Japan) 11 was optically connected to one end of the optical fiber, and side brightness at a point of 30 cm from the light source was measured with a (color) brightness meter (obtained under the trade designation "CS-100" from Minolta Co., Tokyo, Japan) 12. Side brightness of each optical at 30 cm from LED light source 11 is shown in Table 1, below.

The external appearance of the Examples 1-8 and Comparative Examples A-C optical fibers was evaluated. "Layer separation" and "scratch" were intentionally formed on each optical fiber. "Layer separation" was formed by placing a sample on a flat plate of stainless steel, and by dropping a stainless steel rod 10 mm in diameter, 120 mm in length, and 75 g in weight from the height of 100 mm in the direction intersecting the optical fiber orthogonally. "Scratch" was formed by rubbing the outer surface of an optical fiber three times with a coated abrasive article (available under the trade designation "IMPERIAL LAPPING FILM 263X" (40 micrometers) from 3M Company, St. Paul, Minn.).

TABLE 1

| | Light scattering agent in the core | Amount of scattering agent in the core (% by mass) | Light scattering agent in the clad | Light transmittance of clad (%) | Amount of scattering agent in the clad (% by mass) | Side lighting brightness (candela/m$^2$) | Visibility of layer separation | Visibility of scratch |
|---|---|---|---|---|---|---|---|---|
| Example 1 | Silicone resin | 0.0065 | Zinc oxide | 80 | 0.099 | 26 | invisible | Invisible |
| Example 2 | Silicone resin | 0.0065 | Zinc oxide | 72 | 0.132 | 32 | invisible | Invisible |
| Example 3 | Silicone resin | 0.0065 | Zinc oxide | 83 | 0.066 | 25 | invisible | Invisible |
| Example 4 | Silicone resin | 0.0065 | Zinc oxide | 86 | 0.050 | 28 | invisible | Invisible |
| Example 5 | Silicone resin | 0.05 | Zinc oxide | 80 | 0.132 | 13 | invisible | Invisible |
| Example 6 | Silicone resin | 0.001 | Zinc oxide | 80 | 0.132 | 6 | invisible | Invisible |
| Example 7 | Silicone resin | 0.10 | Zinc oxide | 80 | 0.099 | 2 | invisible | Invisible |
| Example 8 | Silicone resin | 0.0005 | Zinc oxide | 80 | 0.099 | 3 | invisible | Invisible |
| Comparative Example A | Silicone resin | 0.0065 | Zinc oxide | 65 | 0.196 | 30 | visible | Invisible |
| Comparative Example B | Silicone resin | 0.0065 | None | 93 | 0.0 | 22 | invisible | Visible |
| Comparative Example C | None | 0 | None | 93 | 0.0 | 3 | invisible | Visible |

Table 1 shows the result of evaluation of the visibility of "layer separation" and "scratch." Evaluation was performed in a dark room by three evaluators having no problem in visual acuity by viewing a sample at a distance of 1 meter from the optical fiber with naked eyes. LED light source ("NSPW 300CS") was connected to one end of the optical fiber for supplying light to the optical fiber, and whether or not a dark defect or a bright spot due to the presence of "layer separation" or "scratch" is visible was evaluated. As shown in Table 1, in the case of Examples 1-8 with light transmittance of clad 3 of 70% or more and 90% or less, even if "layer separation" or "scratch" was present, they were invisible. In the case of Examples 1-6, brightness of side lighting of 6 or higher was obtained. In contrast, "layer separation" was visible in Comparative Example A, and "scratch" was visible in Comparative Examples B and C.

The present invention has been described above with reference to preferred embodiments thereof, but it will be appreciated by those skilled in the art that various changes and modifications are possible without departing from the scope of claims to be described below.

What is claimed is:

1. A side lighting optical fiber comprising:
   a core containing a first light scattering agent; and
   a clad disposed generally concentric to the core and containing a second light scattering agent, wherein light transmittance of the clad at a light wavelength of 550 nm is in a range of 70-90%.

2. A side lighting optical fiber according to claim 1, wherein the first light scattering agent is contained in the core in an amount in a range, by mass, from 0.0008% to 0.08%.

3. A side lighting optical fiber according to claim 1, wherein the first light scattering agent is silicone particles.

4. A side lighting optical fiber according to claim 1, wherein thickness of the clad is in a range of 0.1 mm to 0.8 mm, and the second light scattering agent is contained in said clad in an amount of 0.05-0.15% by mass.

5. A side lighting optical fiber according to claim 1, wherein the core is formed mainly of acrylic polymer, and the clad is mainly formed of fluoropolymer.

6. A side lighting optical fiber according to claim 1, wherein the second light scattering agent is zinc oxide particles.

7. A side lighting optical fiber according to claim 1, wherein the first light scattering agent is contained in the core in an amount in a range, by mass, from 0.0008% to 0.08%, the thickness of the clad is in a range of 0.1 mm to 0.8 mm, and the second light scattering agent is contained in said clad in an amount of 0.05-0.15% by mass.

8. A side lighting optical fiber according to claim 7, wherein the core is formed mainly of acrylic polymer.

9. A side lighting optical fiber according to claim 8, wherein the clad is mainly formed of fluoropolymer.

10. A side lighting optical fiber according to claim 8, wherein the first light scattering agent is silicone particles.

11. A side lighting optical fiber according to claim 9, wherein the second light scattering agent is zinc oxide particles.

12. A side lighting optical fiber according to claim 10, wherein the second light scattering agent is zinc oxide particles.

13. A side lighting optical fiber according to claim 1, wherein the core is formed mainly of acrylic polymer, the clad is mainly formed of fluoropolymer, the first light scattering agent is silicone particles and is contained in the core in an amount in a range, by mass, from 0.0008% to 0.08%, the second light scattering agent is zinc oxide particles and is contained in said clad in an amount of 0.05-0.15% by mass, and the thickness of the clad is in a range of 0.1 mm to 0.8 mm.

14. An illumination for a vehicle comprising a side lighting optical fiber according to claim 1.

15. The illumination according to claim 14, wherein said side lighting optical fiber forms part of an instrument panel, door panel, or console box of a vehicle.

16. A lamp comprising a side lighting optical fiber according to claim 1.

17. The lamp according to claim 16, wherein said lamp is a curtain lamp, a map lamp, or a room lamp.

18. An exterior decoration comprising a side lighting optical fiber according to claim 1.

19. The exterior decoration according to claim 18, wherein said decoration is a signboard, show window, or show case.

\* \* \* \* \*